United States Patent
Sherlock

(10) Patent No.: US 10,678,475 B2
(45) Date of Patent: Jun. 9, 2020

(54) TRACKING WRITE REQUESTS TO MEDIA CONTROLLERS

(71) Applicant: HEWLETT PACKARD ENTERPRISE DEVELOPMENT LP, Houston, TX (US)

(72) Inventor: Derek Alan Sherlock, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 106 days.

(21) Appl. No.: 15/661,323

(22) Filed: Jul. 27, 2017

(65) Prior Publication Data

US 2019/0034117 A1   Jan. 31, 2019

(51) Int. Cl.
G06F 3/06     (2006.01)
G06F 13/16    (2006.01)
G06F 12/02    (2006.01)

(52) U.S. Cl.
CPC ............ *G06F 3/0659* (2013.01); *G06F 3/061* (2013.01); *G06F 3/0604* (2013.01); *G06F 3/0653* (2013.01); *G06F 3/0661* (2013.01); *G06F 3/0673* (2013.01); *G06F 3/0685* (2013.01); *G06F 12/0238* (2013.01); *G06F 13/16* (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 6,865,648 B1 | 3/2005 | Naamad et al. | |
| 9,195,614 B2 | 11/2015 | Abali et al. | |
| 9,269,438 B2 | 2/2016 | Nachimuthu et al. | |
| 9,430,396 B2 | 8/2016 | Kumar et al. | |
| 2005/0229166 A1 | 10/2005 | Todd et al. | |
| 2013/0263148 A1 | 10/2013 | Brueggen et al. | |
| 2014/0136786 A1 | 5/2014 | Carpenter et al. | |
| 2015/0378606 A1* | 12/2015 | Huang | G06F 3/061 711/103 |
| 2017/0315728 A1* | 11/2017 | Zheng | G06F 3/0604 |
| 2017/0322611 A1* | 11/2017 | Brennan | G06F 1/30 |
| 2018/0004454 A1* | 1/2018 | Sampathkumar | G06F 3/061 |
| 2018/0032439 A1* | 2/2018 | Jenne | G06F 12/0891 |

(Continued)

OTHER PUBLICATIONS

Ellingwood; How to Implement a Basic Firewall Template with Iptables on Ubuntu 14.04; https://www.digitalocean.com/community/tutorials/how-to-implement-a-basic-firewall-template-with-iptables-on-ubuntu-14-04; Aug. 20, 2015; 13 pages.

(Continued)

*Primary Examiner* — Charles Rones
*Assistant Examiner* — Jonah C Krieger
(74) *Attorney, Agent, or Firm* — Nolte Intellectual Property Law Group

(57) ABSTRACT

In some examples, a tracker receives a write request that is acknowledged upon receipt by a destination media controller without waiting for achievement of persistence of write data associated with the write request. The tracker adds an identifier of the destination media controller to a tracking structure in response to the identifier not already being present in the tracking structure. The tracker sends a request to persist write operations to media controllers identified by the tracking structure.

20 Claims, 7 Drawing Sheets

(56) References Cited

U.S. PATENT DOCUMENTS

2018/0276142 A1* 9/2018 Algieri .................. G06F 12/128
2018/0321868 A1* 11/2018 d'Abreu ................ G06F 3/0641
2018/0357174 A1* 12/2018 Sampathkumar ... G06F 12/0882

OTHER PUBLICATIONS

Joshi et al; ATOM—Atomic Durability in Non-volatile Memory Through Hardware Logging; http://homepages.inf.ed.ac.uk/vnagaraj/papers/hpca17a.pdf ; Retrieved Jan. 17, 2017; 12 pages.
European Search Report and Search Opinion Received for EP Application No. 18184255.0, dated Jan. 3, 2019, 6 pages.

* cited by examiner

TRACKING WRITE REQUESTS TO MEDIA CONTROLLERS

BACKGROUND

A system can include a processor and a memory (or multiple processors and/or multiple memories), in addition to other devices. A processor can issue access requests to a memory. The memory can be implemented using a non-persistent (or volatile) memory device and/or a persistent (or non-volatile) memory device. Examples of non-persistent memory devices include dynamic random access memories (DRAMs), static random access memories (SRAMs), and so forth. Examples of persistent memory devices include flash memory devices, memristor memory devices, phase change memory devices, electrically erasable and programmable read-only memory (EEPROM) devices, and so forth.

BRIEF DESCRIPTION OF THE DRAWINGS

Some implementations of the present disclosure are described with respect to the following figures.

Figure 1:
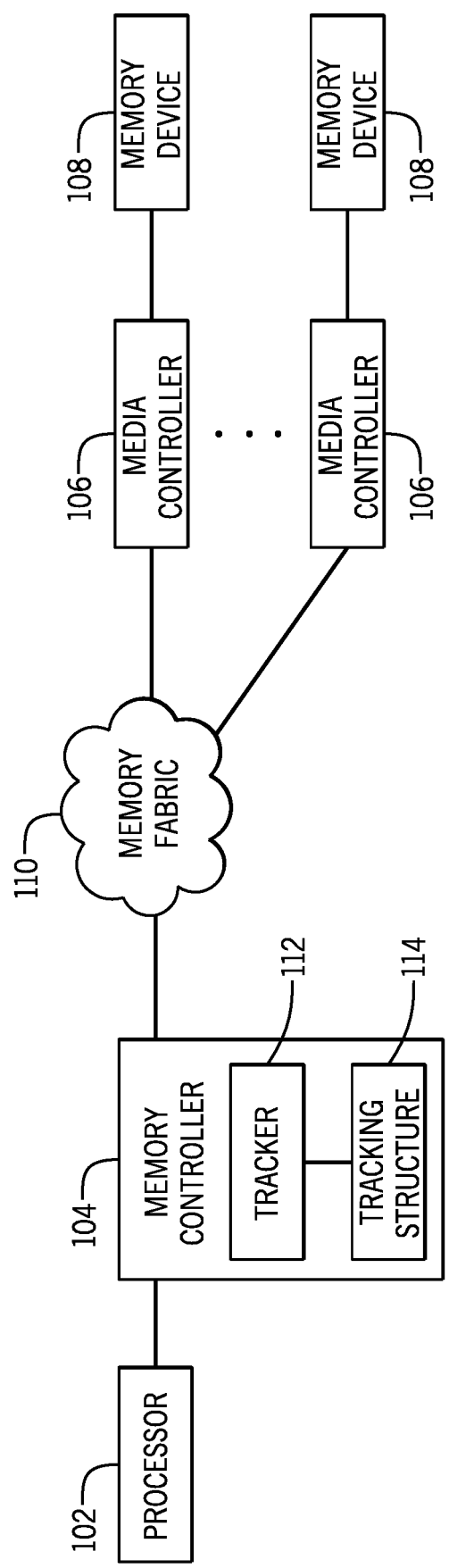
FIG. 1 is a block diagram of a system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Write requests can be issued by processors or other requesters, such as input/output (I/O) devices, to media controllers that manage access of corresponding memory devices. The memory devices can include persistent memory devices and non-persistent memory devices. A persistent memory device maintains its stored content (i.e., does not lose the stored content) when power is removed from the persistent memory device. On the other hand, a non-persistent memory device loses its stored content when power is removed from the non-persistent memory device.

A first type of write request (referred to as a "standard write request" in the ensuing discussion) is acknowledged by a media controller without waiting for achievement of persistence of write data associated with the write request. In other words, once the media controller receives the standard write request and has queued it for future persistence, the media controller can send an acknowledgment back to the requester, even though the write data may not have been persisted (i.e., persistently stored) in a persistent memory device. In response to the acknowledgment to the standard write request, the requester cannot be certain that the write data for the standard write request has been persistently stored.

A second type of write request (referred to as a "persistent write request" in the ensuing discussion) is acknowledged by the media controller after the media controller has completed the write of data for the persistent write request to the persistent memory device. In response to the acknowledgment to the persistent write request, the requester can confirm that the write data for the persistent write request has been persistently stored.

Another request that can be sent by a requester is a persistent flush request, which is a request to cause all previous pending standard write requests of the requester to be persisted, and which request is acknowledged by the media controller only once in response to all such previous pending standard writes having achieved persistence. In response to a persistent flush request, a media controller checks to ensure that the write data for all the previous pending standard write requests have been persistently stored, and then sends a single acknowledgment to the requester in response to determining that the write data for all the previous pending standard write requests have been persistently stored.

Although using persistent write requests allows a requester to receive acknowledgments on an individual write-request basis that the respective write data has been persistent, issuing a large number of persistent write requests can slow down overall system operation, since media controllers have to wait for corresponding write data to be persisted (which can involve writes to relatively slow persistent memory devices) before the media controllers can send acknowledgments back to the requester.

Although media controllers with persistent posting buffers can send acknowledgments to persistent write requests upon posting the persistent write requests to the persistent posting buffers (which have higher access speeds than persistent memory devices), media controllers with persistent posting buffers are generally more costly than media controllers with non-persistent posting buffers. Therefore, implementing a large system with many media controllers including persistent posting buffers can lead to increased overall cost of the large system.

Using standard write requests followed by a persistent flush request can lead to improved system performance and/or lower system implementation costs as compared to use of persistent write requests. By using a single persistent flush request, just one fabric request per media controller is used to track persistence of multiple previous standard write requests, rather than multiple requests being involved in tracking completion of multiple standard write requests. Thus the number of tracking resources occupied on a requester pending achievement of persistence is greatly reduced.

The persistent flush request has to be issued to all media controllers to which standard write requests have been previously sent. However, a system may not be aware of which media controllers are recipients of standard write requests, so the persistent flush request may have to be broadcast to all media controllers in a system. In a system with a large number of media controllers, broadcasting persistent flush requests to all of the media controllers can be prohibitively expensive from the point of view of network bandwidth and consumption of system resources.

In accordance with some implementations of the present disclosure, a tracker can be used to efficiently track, for a given requester, media controllers to which standard write request(s) has (have) been sent since the last time a persistent flush request was sent by the given requester. The tracker uses a tracking structure (in the form of a list, a table, or any other type of data structure) that can store identifiers of media controllers to which standard write requests have been sent. In a system that is capable of including a large number of media controllers, the tracking structure can be of a size that does not allow the tracking structure to store identifiers of all possible media controllers. It may be impractical to implement a tracking structure that is large enough to store identifiers of all possible media controllers in a large system. Moreover, managing a large tracking structure can be associated with higher overhead in terms of system resource usage.

To confirm persistence of all pending standard write requests of a given requester, the tracker can send persistent flush requests to just the media controllers identified by the tracking structure (instead of broadcasting persistent flush requests to all media controllers in the system). In many instances, the small tracking structure is able to track media controllers to which standard write requests have been sent without overflowing, since a requester normally does not send write requests to a large number of media controllers. However, in cases where the tracking structure becomes full, mechanisms are provided to address the overflow condition of the tracking structure. Moreover, mechanisms can be provided to detect an almost full condition of the tracking structure, and to take action to reduce the number of entries in the tracking structure in response to the almost full condition.

FIG. 1 is a block diagram of an example system that includes a processor 102 and a memory controller 104. The memory controller 104 can be separate from the processor 102, but connected to the processor 102 (directly or through another device). Alternatively, the memory controller 104 can be part of the processor 102. A processor can include a microprocessor, a core of a multi-core microprocessor, a microcontroller, a programmable integrated circuit, a programmable gate array, a system-on-a-chip (SoC), or another hardware processing circuit.

Although FIG. 1 shows just one processor 102 and the corresponding memory controller 104, in other examples, there can be multiple processors and respective memory controllers, or more generally, multiple requesters and respective memory controllers. A requester can refer to any device, such as a processor, an I/O device, and so forth, that is able to access data of a memory device. In some examples, there can be a one-to-one correspondence between a requester and a memory controller. In other examples, a requester can attach to a memory fabric via multiple memory controllers, or multiple requesters may attach to a memory fabric via a single shared memory controller.

The system further includes media controllers 106 that manage access of respective memory devices 108. A memory device 108 can refer to an individual memory integrated circuit (IC) chip, or to a memory module that has multiple memory IC chips. More generally, a memory device can refer to any arrangement of memory elements, whether implemented on one IC chip or multiple IC chips, or on one circuit board or multiple circuit boards.

A media controller refers to a controller that is able to issue access commands to a memory device that meets a timing and protocol specification of the memory device. The protocol specification can define the access commands in the form of specific combinations of signals that are activated to cause corresponding memory access operations, including a read operation, a write operation, or any other operation that involves an access of a memory element (or a group of memory elements) of a memory device.

The timing specification governs timings of the signals, including, for example, minimum and/or maximum timing specifications of signals that are used to access the memory device.

Different types of memory devices can have different timing and protocol specifications.

The memory controller 104 is able to issue read and write requests that do not conform to timing and protocol specifications of specific memory devices. The read and write requests (as well as other access requests) issued by the memory controller 104 are more general requests. The memory access requests are issued by the memory controller 104 in response to respective requests of the processor 102. The memory access requests are sent over a memory fabric 110 to a target media controller 106 (or multiple target media controllers 106).

The memory fabric 110 can include a network, a link, a bus, or any other type of interconnect to allow for communication between the memory controller 104 and the media controllers 106.

A media controller 106 receiving a memory access request from a memory controller 104 can generate the corresponding access commands to access the respective memory device 108. For a write request, data provided by the memory controller 104 is written by the media controller 106 to the respective memory device 108. For a read request, the media controller 106 retrieves read data from the respective memory device 108, and sends the read data over the memory fabric 110 to the memory controller 104.

In accordance with some implementations of the present disclosure, the memory controller 104 includes a tracker 112 that is able to track media controllers to which standard write requests have been sent by the memory controller 104. The tracker 112 can be implemented as a hardware processing circuit within the memory controller 104. In other examples, the tracker 112 can be implemented as machine-readable instructions executable by the hardware processing circuit of the memory controller 104.

The tracker 112 maintains a tracking structure 114, which can be stored in a memory of the memory controller 104, or can be stored on external memory accessible by the memory controller 104. The tracker 112 can store, in the tracking structure 114, identifiers of media controllers 106 to which standard write requests have been sent.

Figure 2:
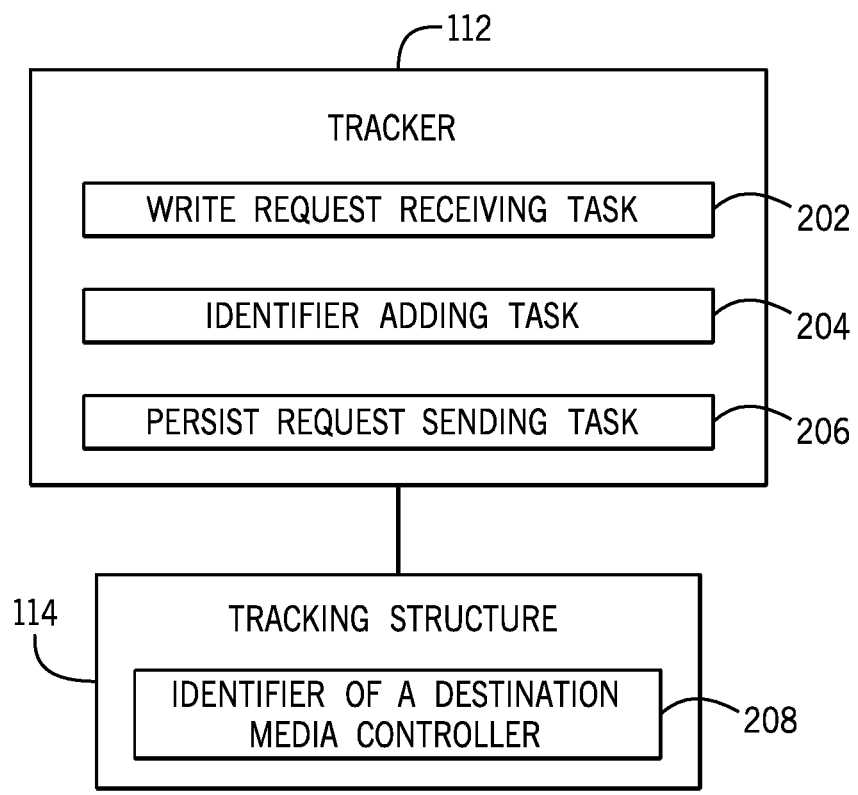
FIG. 2 is a block diagram of a tracker and a tracking structure according to some examples.

FIG. 2 depicts tasks of the tracker 112 according to some implementations. The tracker 112 performs a write request receiving task (202) that receives a write request (and more specifically, a standard write request) that is acknowledged upon receipt by a destination media controller 106 without waiting for achievement of persistence of write data associated with the standard write request. The acknowledging involves the destination media controller 106 sending an acknowledgement of the standard write request to the memory controller 104. The acknowledgement can be in the form of any type of information, such as a message, an information element within a message, and so forth, that provides an indication that the standard write request has been received by the destination media controller 104. The acknowledgement that is sent in response to the standard write request merely indicates that the standard write request has been received and is possibly being processed by the destination media controller 106. However, the acknowledgement does not provide any indication that the write data associated with the write request has yet been written to persistent memory. Thus, the memory controller 104 upon receipt of the acknowledgement is not able to make any determination of whether or not the write data associated with the standard write request has yet been persisted (i.e., written to persistent memory).

In response to the standard write request, the tracker 112 performs an identifier adding task (204) that adds an identifier 208 of the destination media controller (to which the standard write request has been sent) to the tracking structure 114. An identifier can refer to any information that can uniquely identify the destination media controller (to distinguish the destination media controller from other media controllers).

Over time, the memory controller 104 may have sent multiple standard write requests to multiple media controllers, such as in response to requests from the processor 102 (or a program executing on the processor 102). The identifiers of all such media controllers to which standard write requests have been sent by the memory controller 104 can be added to the tracking structure 114. The program that executes on the processor 102 can include machine-readable instructions, such as those of software and/or firmware.

At some point, the processor 102 (or the program executing on the processor 102) that caused the memory controller 104 to issue the standard write request may wish to confirm that all prior standard write requests have been persisted. This may be performed as part of a checkpointing procedure or a commit procedure. A checkpointing procedure refers to a procedure to define a specific point (such as a point in time or a point in the execution of a program) where it is confirmed that all prior writes have completed (i.e., have been persisted). A commit operation can refer to making a transaction (which may include multiple write requests) persistent.

The processor 102 may send a persist indication to the memory controller 104 that a confirmation of persistence of pending standard write requests is desired. This indication can be in the form of a specific instruction, such as an instruction to create a barrier. The instruction to create the barrier prevents the processor 102 from issuing any further requests for accessing memory until all pending write requests are confirmed to have persisted.

In response to the persist indication from the processor 102, the tracker 112 can perform a persist request sending task (206), which sends a request to persist write operations to media controllers identified by the tracking structure 114. In some examples, such a request can include a persistent flush request, which as noted above is a request to cause all previous pending standard write requests of a requester to be persisted.

Figure 3:
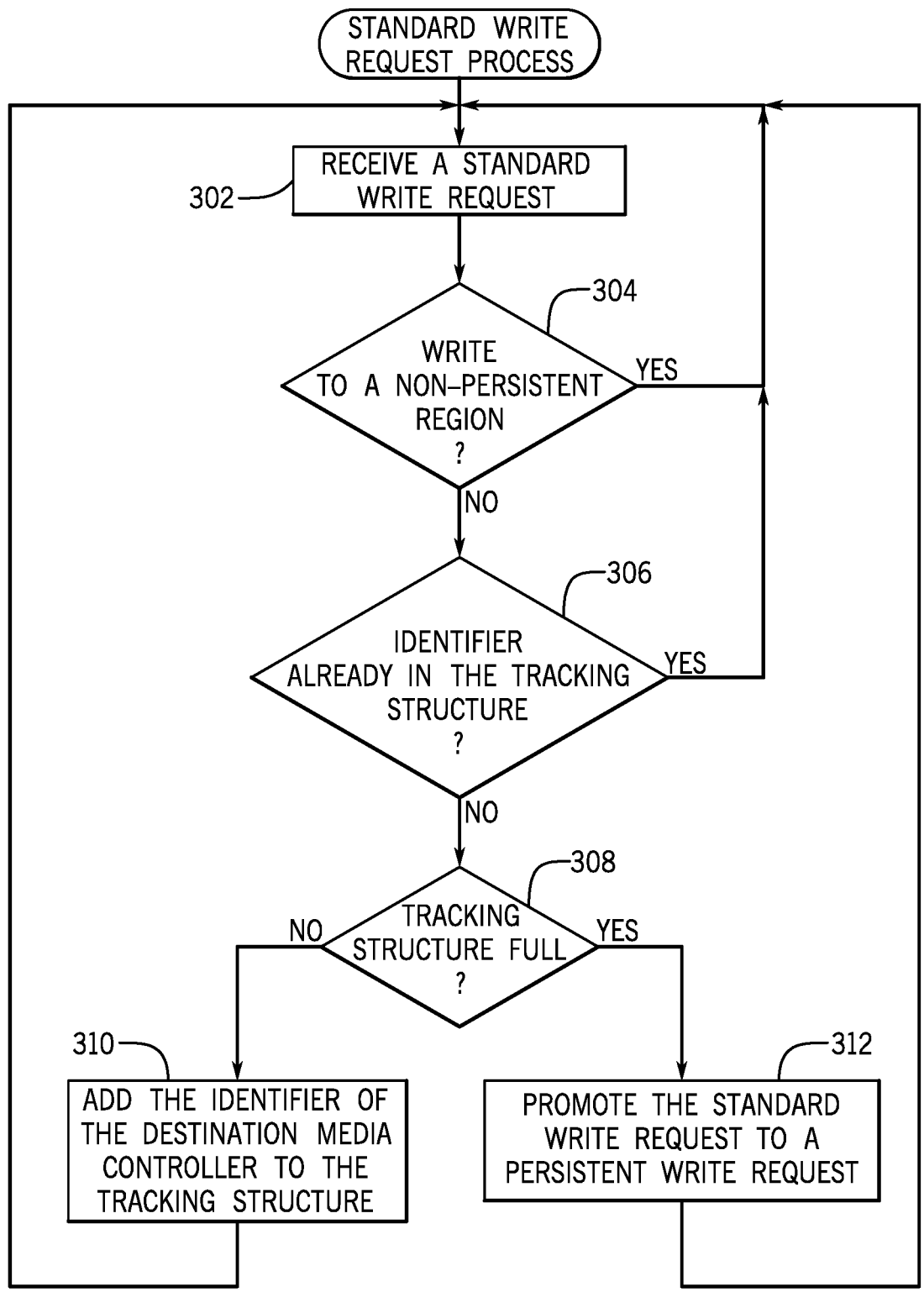
FIG. 3 is a flow diagram of a standard write request process according to further examples.

FIG. 3 is a flow diagram of a standard write request processing performed by the tracker 112 according to further examples. The tracker 112 receives (at 302) a standard write request. The tracker 112 determines (at 304) whether the standard write request is requesting a write to a non-persistent region of memory. For example, the non-persistent region of memory can be part of a non-persistent memory such as a dynamic random access memory (DRAM), a static random access memory (SRAM), or other type of non-persistent memory. If the standard write request is a request to write to a non-persistent region, then no further action is taken by the tracker 112 (i.e., the tracker 112 declines to update the tracking structure in response to the further write request), and the standard write request is forwarded to the applicable media controller.

However, if the write is to a persistent region, the tracker 112 determines (at 306) whether an identifier of the destination media controller (of the standard write request) is already in the tracking structure 114. If so, no further action has to be taken by the tracker 112 (i.e., the tracker 112 declines to update the tracking structure in response to the standard write request), and the process returns to wait for the next standard write request. If the identifier of the destination media controller for the received standard write request is already in the tracking structure 114, then that means that a subsequent persistent flush request sent to confirm persistence of all pending standard write requests would be sent to the destination media controller that is already identified by the tracking structure 114.

If the identifier of the destination media controller (of the standard write request) is not already in the tracking structure 114, the tracker 112 determines (at 308) whether the tracking structure 114 is full. The tracking structure 114 is full if all entries of the tracking structure 114 have been filled with identifiers of respective media controllers to which standard write requests have been sent by the memory controller 104.

If the tracking structure 114 is not full, the tracker 112 adds (at 310) an identifier of the destination media controller (for the received standard write request) to the tracking structure 114. At this point, the received standard write request is allowed to be sent by the memory controller 104 over the memory fabric 110 to the destination media controller.

Following task 310, the process returns to wait for the next standard write request.

However, if the tracker 112 determines (at 308) that the tracking structure 114 is full, the tracker 112 promotes (at 312) the standard write request to a persistent write request, to generate the persistent write request in place of the standard write request. As noted above, a persistent write request is a write request that is acknowledged by the destination media controller after the destination media controller has completed the write of data for the persistent write request to a persistent memory. The tracker 112 promoting the standard write request to a persistent write request can involve the tracker 112 converting the standard write request to a persistent write request, such as by setting a flag in a header of the write request from a first value indicating a standard write request to a second value indicating a persistent write request. The persistent write request (instead of the standard write request) is then sent by the memory controller 104 over the memory fabric 110 to the destination media controller. Note that a persistent write request does not have to be tracked in the tracking structure 114, since any acknowledgement received from the destination media controller of the persistent write request confirms persistence of the write data associated with the persistent write request.

In accordance with some implementations of the present disclosure, a full tracking structure 114 is not a blocking condition; in other words, the tracker 112 does not block issuance of a write request to a destination media controller when the tracking structure 114 is full. Rather, if the tracking structure 114 is full, the tracker 112 causes a standard write request to be changed to a persistent write request so that the write request can be issued to the destination media controller.

From task 312, the tracker 112 can return to wait for the next standard write request.

Figure 4:
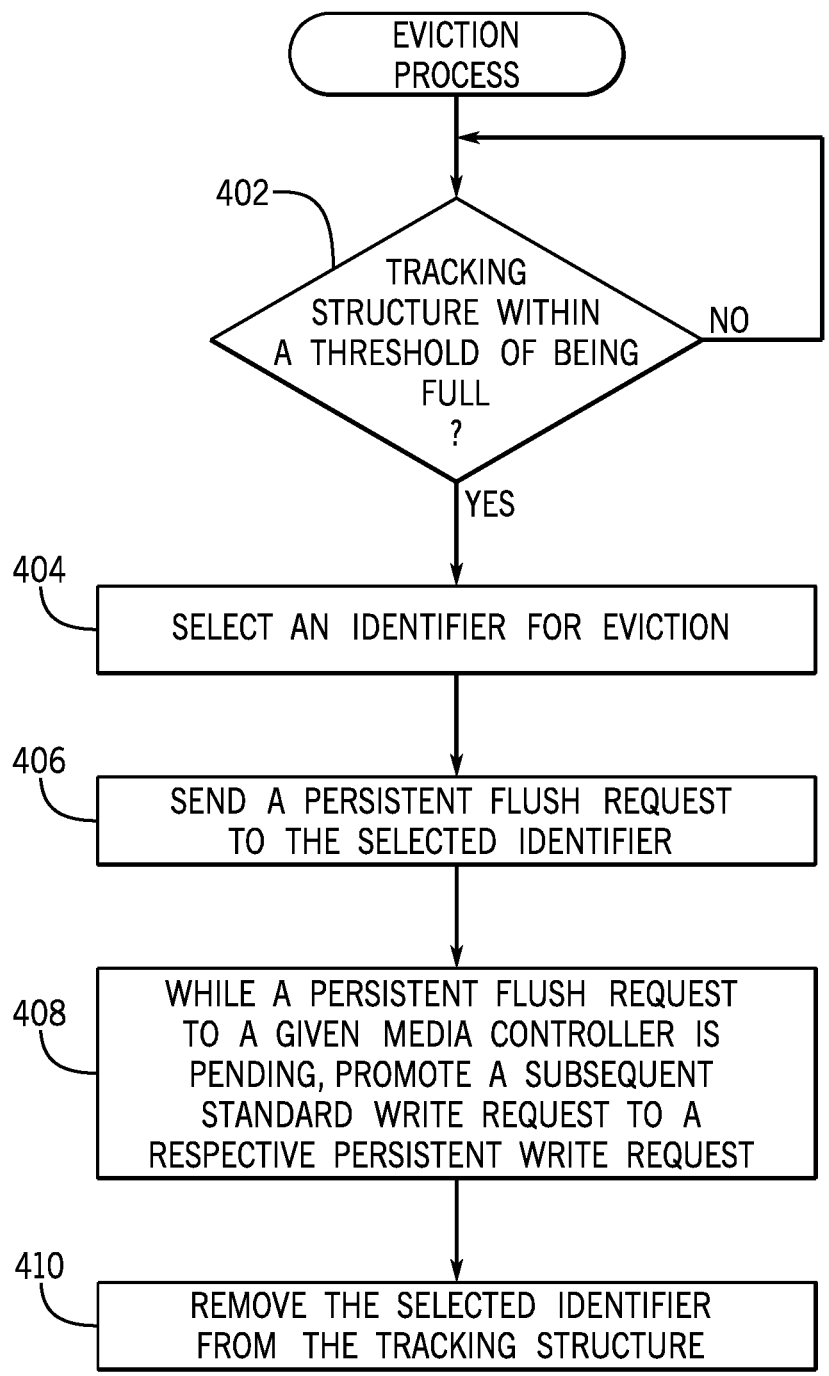
FIG. 4 is a flow diagram of an eviction process according to some examples.

FIG. 4 is a flow diagram of an eviction process that can be performed by the tracker 112 according to further examples. Eviction refers to removing an identifier of a media controller (or identifiers of multiple media controllers) from the tracking structure 114. Removing identifier(s) of media controller(s) of the tracking structure 114 provides more room in the tracking structure 114 for adding identifiers of further standard write requests received by the tracker 112. The eviction of identifiers from the tracking structure 114 can be performed autonomously and opportunistically by the tracker 112. In other words, the tracker 112 can perform the eviction without receiving any request or demand from the processor 102 or other requester. The eviction is proactively performed based on detecting that a specified condition is met, to reduce the likelihood of the tracking structure 114 becoming full.

The tracker 112 determines (at 402) whether the tracking structure 114 is within a threshold of being full (i.e., the tracking structure 114 is nearly full). For example, the tracker 112 can determine whether the tracking structure 114 is within a specified percentage of being full, or can determine whether less than a specified number of available entries are left in the tracking structure 114.

If the tracking structure is not within the threshold of being full, then the tracker 112 does not take any eviction action. However, if the tracking structure 114 is within the threshold of being full, the tracker 112 selects (at 404) a media controller identifier from the tracking structure 114 for eviction.

The selection of a media controller identifier for eviction can be based on a least recently used (LRU) policy, a not recently used (NRU) policy, or some other policy (e.g., random selection of a media controller identifier or some other selection technique). An LRU policy specifies that the media controller identifier selected for eviction is the media controller identifier that was least recently used in memory requests. An NRU policy specifies that the media controller identifier selected for eviction is the media controller identifier that was not recently used.

The tracker 112 then sends (at 406) a persistent flush request to the selected media controller identifier.

While a persistent flush request is pending to a given media controller identifier, any subsequent standard write request to the given media controller identifier is promoted (at 408) by the tracker 112 to a respective persistent write request to the given media controller identifier.

The tracker 112 removes the selected media controller identifier from the tracking structure 114 when the tracker 112 receives acknowledgement from the media controller that the persistent flush operation has completed, i.e., persistence has been achieved for all prior standard writes sent to that media controller.

Figure 5:
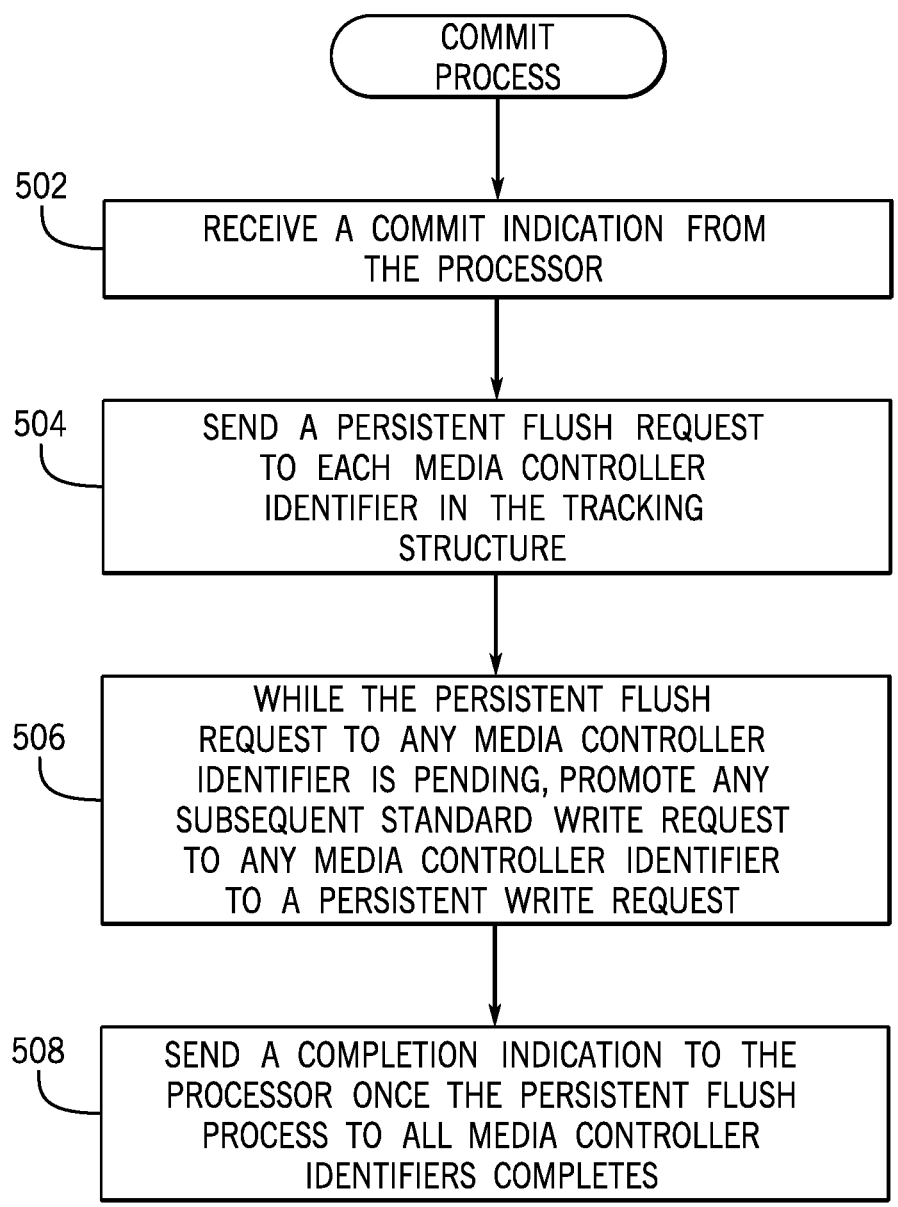
FIG. 5 is a flow diagram of a commit process according to some examples.

FIG. 5 is a flow diagram of an example commit process that can be performed by the tracker 112 according to some examples. The tracker 112 receives (at 502) a commit indication from the processor 102. The commit indication is an indication that the processor 102 (or a program executed on the processor 102) wants to create a write ordering barrier.

In response to the commit indication, the tracker 112 sends (at 504) a persistent flush request to each media controller identifier that is in the tracking structure 114. While the persistent flush request to any of the media controller identifiers is pending, any subsequent standard write request to any of the media controller identifiers is promoted (at 506) by the tracker 112 to a persistent write request. Note that according to the example commit process of FIG. 5, all standard write requests are promoted regardless of which media controller is targeted, until such time that all persistent flushes have completed. Once the persistent flush process to all media controller identifiers completes, a corresponding completion indication can be sent back (at 508) to the processor 102. At this time, insertion of identifiers of media controllers to which standard write requests have been sent can resume. With the example commit process of FIG. 5, the content of the tracking structure gradually decreases to zero during the commit process. A completely empty condition of the tracking structure can be an indication that the commit process has completed.

Another example commit process proceeds as follows. Each media controller is treated independently. The alternative commit process sends each respective media controller identified in the commit process a persistent flush request. While a persistent flush is pending to the respective media controller, any standard write request to the respective media controller is promoted to a persistent write request. Normal operation is resumed independently for each respective media controller after persistent flush has completed for the respective media controller. The commit operation as a whole completes when the last of the individual persistent flushes to the media controllers completes.

With the alternative commit process, normal operation is resumed independently at different times as each participating media controller completes its respective persistent flush (where normal operation refers to recording of writes in the tracking structure, and ceasing to promote standard write requests to persistent write requests). As a result, the tracking structure as a whole may not become fully empty, since new entries may be inserted before all the old entries have been removed.

With either of the foregoing commit processes discussed above, the list of media controllers that receive persistent flush requests is determined by the membership of the tracking structure at the time the commit indication. Also, In either case, completion of the commit operation (acknowledgement sent to processor) is collective, occurring only when all the issued persistent flushes to all the relevant media controllers have completed.

In accordance with some implementations, the tracker 112 and tracking structure 114 can continue to be used even when a configuration of the overall system changes, such as by adding, removing, or changing media controllers, or adding, removing, or changing processors or other requesters. The identifiers of media controllers do not have to be pre-configured to be used with the tracking structure 114 and the tracker 112. Even if a new media controller and a corresponding new media controller identifier is added to the system, the tracker 112 can track the new media controller identifier once standard write requests are issued to the new media controller identifier.

The size of the tracking structure 114 can remain at a reasonable size, such that the cost of implementing a memory to store the tracking structure 114 and of managing the tracking structure 114 can be kept lower than implementations where all possible media controller identifiers have to be tracked. The tracker 112 only has to track certain types of write requests (i.e., standard write requests to a persistent memory region), and thus does not have to waste resources tracking persistent write requests nor standard write requests to non-persistent memory regions. Moreover, by implementing the tracker 112 in the memory controller 104, the tracking does not have to be implemented in software by a program executed on the processor 102.

Figure 6:
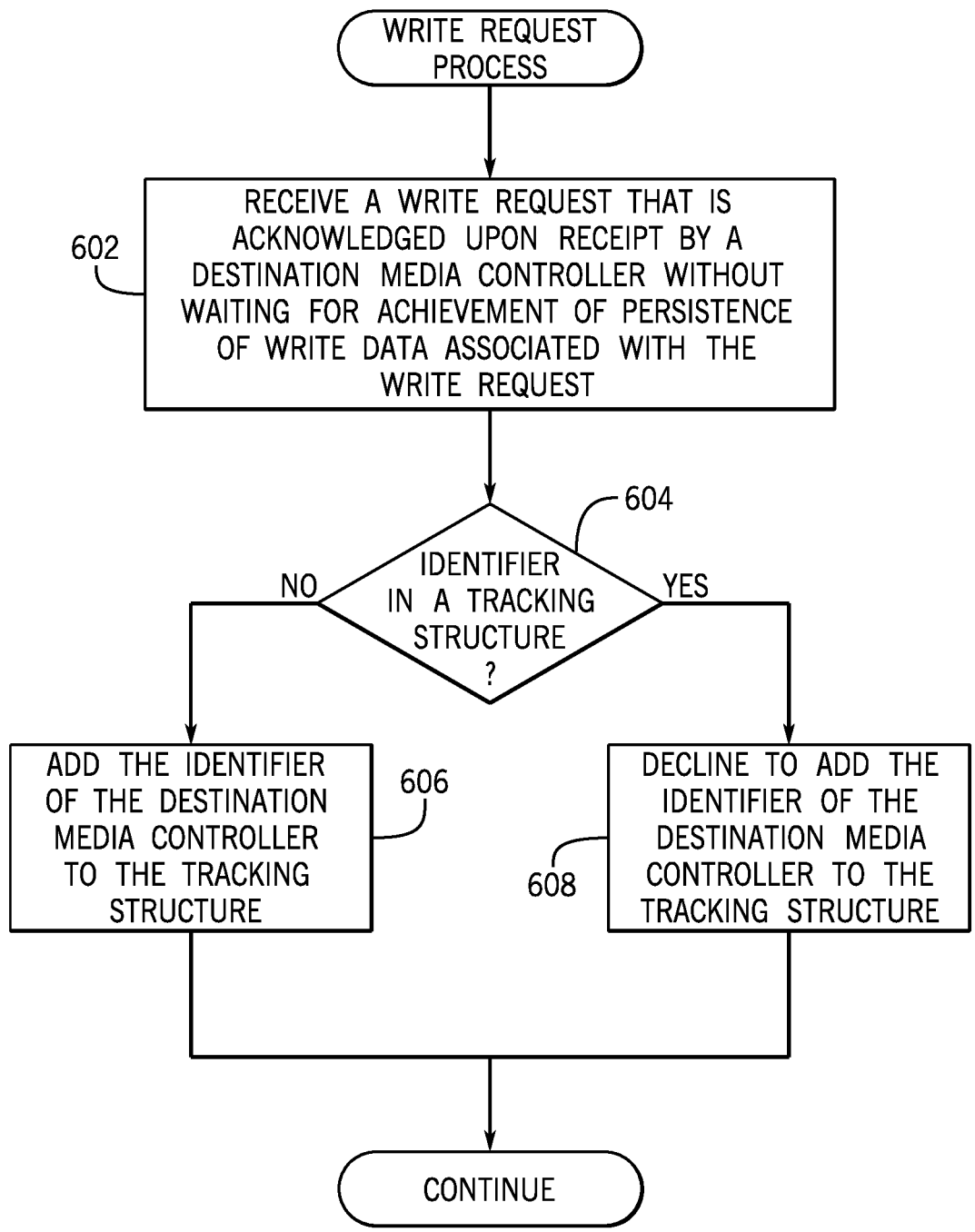
FIG. 6 is a flow diagram of a write request process according to some examples.

FIG. 6 is a flow diagram of a process according to some examples. The process of FIG. 6 receives (at 602) a write request that is acknowledged upon receipt by a destination media controller without waiting for achievement of persistence of write data associated with the write request.

The process of FIG. 6 determines (at 604) whether an identifier of the destination media controller is already in a tracking structure.

In response to determining that the identifier of the destination media controller is not already in the tracking structure, the process of FIG. 6 adds (at 606) the identifier of the destination media controller to the tracking structure.

In response to determining that the identifier of the destination media controller is already in the tracking structure, the process of FIG. 6 declines (at 608) to add the identifier of the destination media controller to the tracking structure.

Figure 7:
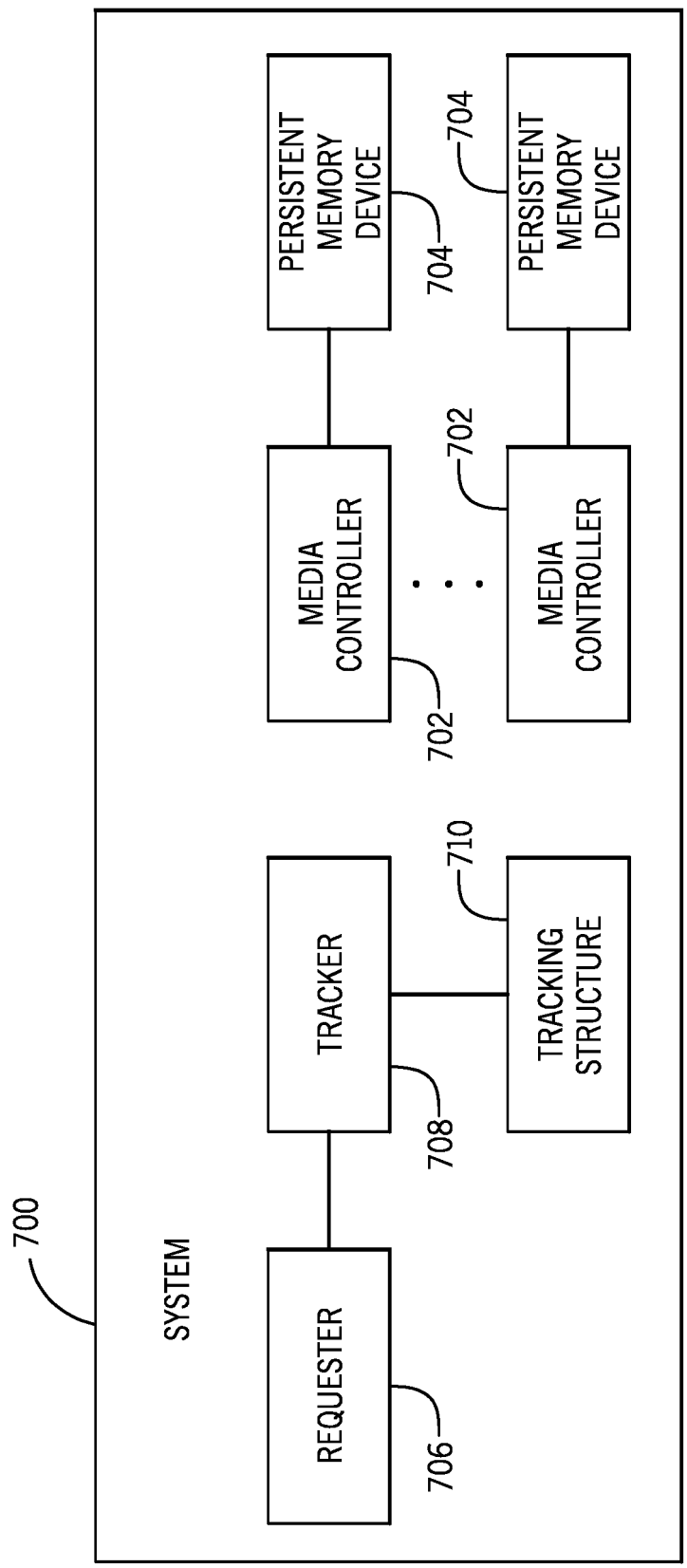
FIG. 7 is a block diagram of a system according to further examples.

FIG. 7 is a block diagram of a system 700 according to further examples. The system 700 includes media controllers 702 to manage access of persistent memory devices 704.

A requester 706 causes issuance of write requests targeted to the media controllers 702. A tracker 708 performs the following tasks. For a first write request that is acknowledged upon receipt by a destination media controller without waiting for achievement of persistence of write data associated with the write request, the tracker 708 adds an identifier of the destination media controller to a tracking structure 710.

In response to a condition being satisfied, the tracker 708 sends a request to persist write operations to media controllers identified by the tracking structure, where the request to persist write operations causes pending write requests to be persisted and the persistence acknowledged. The condition being satisfied can include: (1) the tracker 708 receiving a request from the requester to commit previous write operations issued by a requester, or (2) tracker determining that the tracking structure is within a threshold of being full.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
a processor; and
a non-transitory storage medium storing instructions executable on the processor to;
send a write request to a destination media controller;
receive, from the destination media controller, an acknowledgment of the write request upon receipt of the write request by the destination media controller prior to persistence of write data associated with the write request;
add an identifier of the destination media controller to a tracking structure in response to the identifier not already being present in the tracking structure; and
send a request to persist write operations to media controllers identified by the tracking structure.

2. The device of claim 1, wherein the instructions are executable on the processor to:
determine whether the write request is targeted to a persistent memory region, and
add the identifier of the destination media controller to the tracking structure in response to determining that the write request is targeted to a persistent memory region and the identifier is not already present in the tracking structure.

3. The device of claim 2, wherein the instructions are executable on the processor to further:
receive a further write request to a further destination media controller;
determine whether the further write request is targeted to a persistent memory region; and
in response to determining that the further write request is not targeted to a persistent memory region, decline to update the tracking structure in response to the further write request.

4. The device of claim 1, wherein the instructions are executable on the processor to:
determine whether the tracking structure is full; and
add the identifier of the destination media controller to the tracking structure in response to determining that the tracking structure is not full.

5. The device of claim 4, wherein the instructions are executable on the processor to further:
receive a further write request to a further destination media controller;
in response to determining that the tracking structure is full, generate a persistent write request in place of the further write request; and
send the persistent write request instead of the further write request to the further destination media controller.

6. The device of claim 1, wherein the instructions are executable on the processor to further:
receive a further write request to the destination media controller;
determine whether the identifier of the destination media controller is already in the tracking structure; and
in response to determining that the identifier of the destination media controller is already in the tracking structure, decline to update the tracking structure in response to the further write request.

7. The device of claim 1, wherein the instructions are executable on the processor to further:
determine whether the tracking structure is within a threshold of being full; and
in response to determining that the tracking structure is within the threshold of being full, send a request to persist write operations to at least one media controller identified by the tracking structure.

8. The device of claim 7, wherein the instructions are executable on the processor to further:
select an identifier of the at least one media controller based on a predetermined policy.

9. The device of claim 1, wherein the instructions are executable on the processor to further:
receive a request to commit previous write operations issued by a requester; and
in response to receiving the request to commit previous write operations, send the request to persist write operations to the media controllers identified by the tracking structure.

10. The device of claim 1, wherein the instructions are executable on the processor to:
receive a further write request to the destination media controller while the request to persist write operations is pending;

generate a persistent write request in place of the further write request; and send the persistent write request instead of the further write request to the destination media controller.

11. A method of a first controller, comprising:
sending a write request to a destination media controller;
receiving, from the destination media controller, an acknowledgment of the write request responsive to receipt of the write request sent by the first controller by the destination media controller prior to persistence of write data associated with the write request;
determining whether an identifier of the destination media controller is already in a tracking structure;
in response to determining that the identifier of the destination media controller is not already in the tracking structure, adding the identifier of the destination media controller to the tracking structure; and
in response to determining that the identifier of the destination media controller is already in the tracking structure, declining to add the identifier of the destination media controller to the tracking structure.

12. The method of claim 11, further comprising:
determining whether the write request is to a persistent memory region,
wherein the adding of the identifier of the destination media controller to the tracking structure is further responsive to determining that the write request is to a persistent memory region.

13. The method of claim 11, further comprising:
determining whether the tracking structure is full; and
wherein the adding of the identifier of the destination media controller to the tracking structure is further responsive to determining that the tracking structure is not full.

14. The method of claim 11, further comprising:
receiving a further write request to a further destination media controller;
in response to determining that the tracking structure is full, generating a persistent write request in place of the further write request; and
sending the persistent write request instead of the further write request to the further destination media controller, wherein the further destination media controller is to acknowledge the persistent write request in response to achieving persistence of write data associated with the further write request.

15. The method of claim 11, further comprising:
determining whether the tracking structure is within a threshold of being full; and
in response to determining that the tracking structure is within the threshold of being full:
sending a request to persist write operations to at least one media controller identified by the tracking structure, and
removing an identifier of the at least one media controller from the tracking structure.

16. The method of claim 11, further comprising:
receiving a request to commit previous write operations issued by a requester; and
in response to receiving the request to commit previous write operations, sending a request to persist write operations to the media controllers identified by the tracking structure.

17. A system comprising:
media controllers to manage access of persistent memory devices;
a requester to cause issuance of write requests targeted to the media controllers; and
a memory controller to:
send a first write request to a destination media controller;
receive, from the destination media controller, an acknowledgment of the first write request responsive to receipt of the first write request by the destination media controller prior to persistence of write data associated with the first write request;
for the first write request, add an identifier of the destination media controller to a tracking structure in response to the identifier not already being present in the tracking structure; and
in response to a condition being satisfied, send a request to persist write operations to media controllers identified by the tracking structure, wherein the request to persist write operations causes pending write requests to be persisted and the persistence acknowledged.

18. The system of claim 17, wherein the condition being satisfied comprises the memory controller receiving a request from the requester to commit previous write operations issued by the requester.

19. The system of claim 17, wherein the condition being satisfied comprises the memory controller determining that the tracking structure is within a threshold of being full.

20. The system of claim 17, wherein the tracking structure includes identifiers of media controllers to which selected write requests have been sent, wherein the selected write requests are acknowledged upon receipt by respective media controllers prior to persistence of write data associated with the selected write requests.

* * * * *